O. TROMLITZ.
VEHICLE WHEEL.
APPLICATION FILED NOV. 15, 1920.

1,389,798.

Patented Sept. 6, 1921.

Inventor
Oscar Tromlitz
By John A. Bonnenhardt
Atty.

UNITED STATES PATENT OFFICE.

OSCAR TROMLITZ, OF CLEVELAND, OHIO.

VEHICLE-WHEEL.

1,389,798.  Specification of Letters Patent.  Patented Sept. 6, 1921.

Application filed November 15, 1920. Serial No. 424,145.

*To all whom it may concern:*

Be it known that I, OSCAR TROMLITZ, a citizen of the United States, residing at Cleveland, in the county of Cuyahoga and State of Ohio, have invented certain new and useful Improvements in Vehicle-Wheels, of which the following is a specification.

This invention relates to vehicle wheels, and has for its object to provide an improved wheel in which the rim portion of the wheel is cushioned with respect to the hub so that the injurious effects of shock will be largely prevented, by the provision of a rubber cushion between the central and outer parts of the wheel, and in which nevertheless the wheel will be of sufficient strength to support lateral stresses, and the parts also assembled in such manner that the traction thrust or drive will be effectively transmitted to the tire.

Figure 1:
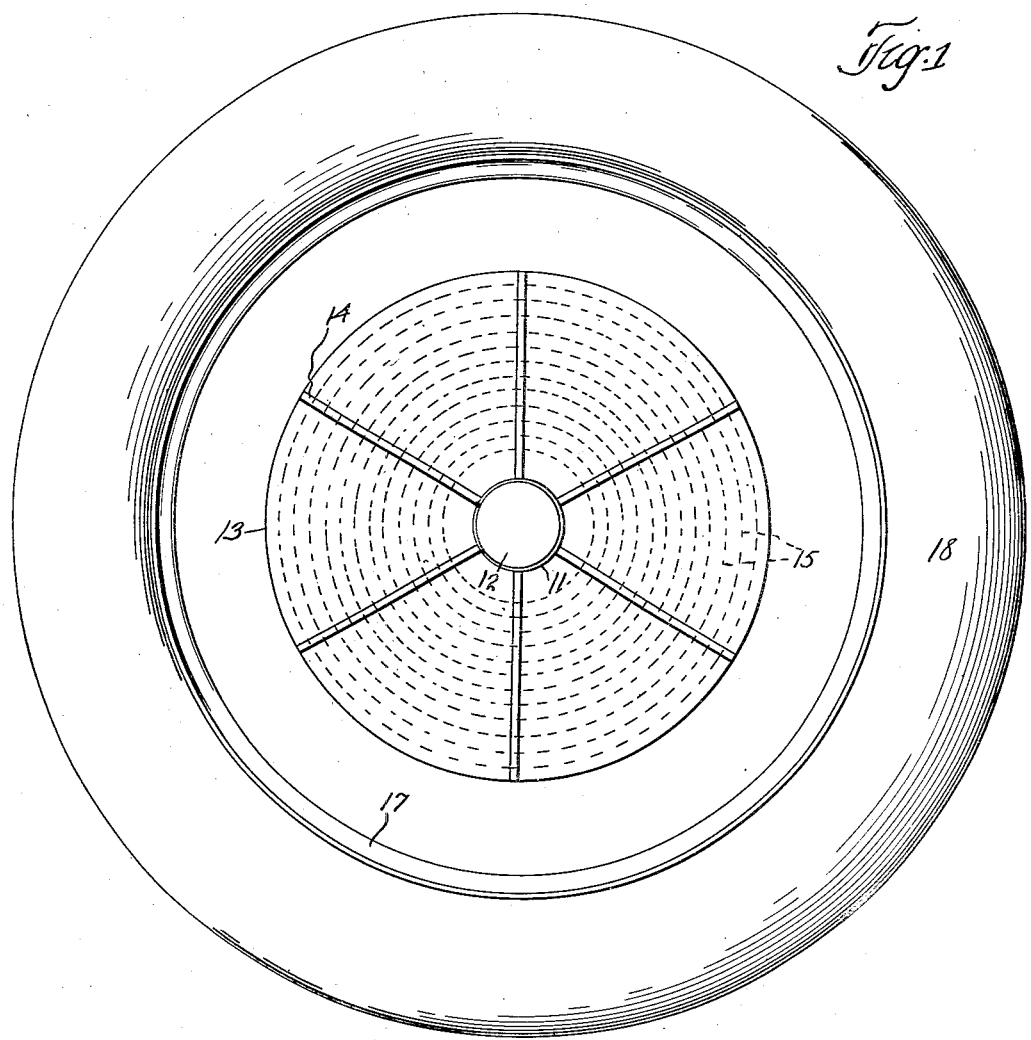
Figure 2:
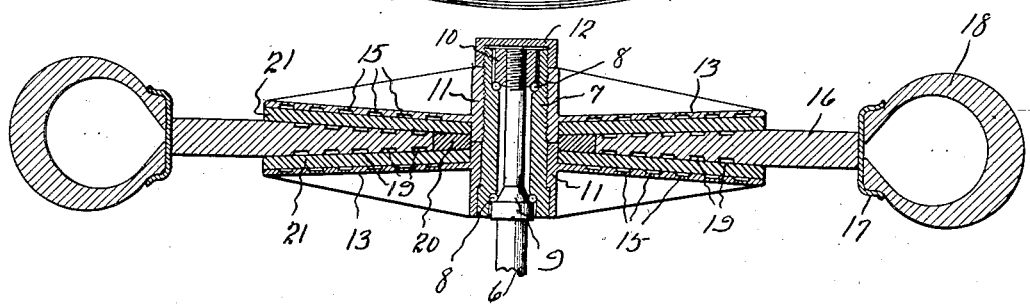

The invention is illustrated in the accompanying drawings in which Figure 1 is a side elevation of the wheel. Fig. 2 is a cross-section thereof.

In the drawings 6 indicates the axle on which the wheel is mounted. The hub of the wheel consists of a steel skein or bushing 7, made preferably in one piece and adapted to fit over the axle. Roller bearings 8 are held in an ordinary manner between this sleeve or skein and the axle, resting at one side on a fixed cone 9 and at the other side on a removable cone 10 which is screwed on to the threaded end of the axle.

Two outer hub sections are fitted on the sleeve. Each of these consists of a tubular section 11 one of which is screwed on the sleeve, which is exteriorly threaded for that purpose, and the metal cap 12 is screwed on the outer end of the sleeve to inclose the outer end of the axle and the outer cone.

Each member 11 is formed integral with a disk or circular plate 13 which is strengthened by radial ribs 14 extending outwardly from the hub part substantially to the periphery of the disk. These disks are inclined slightly outwardly from the center to the outer edge from the middle plane of the wheel so as to form a V-shaped circular space therebetween, and the inner face of which disk is grooved as indicated at 15, the grooves extending concentrically around the disk.

The outer section of the wheel consists of a wood or metal disk 16 carrying the rim 17 which receives a tire 18 in any suitable manner. The disk 16 is tapered, or wedge shaped in cross section, to fit between the adjacent faces of the hub disks as shown, and the opposite sides of the interfitting portion of the disk 16 are concentrically grooved as indicated at 19. A rubber cushion ring 20 is inserted between the inner edge of the disk 16 and the hub, and rubber cushion plates or disks 21 are inserted between the grooved faces of the disks 13 and 16. When the hub sections are screwed up the disk 16 will be clamped between the rubber facings of the disks 13, and the rubber cushions being compressed slightly into the grooves will supply the desired frictional resistance to both the radial and circumferential strains.

When a wheel so assembled is used, radial shocks will cause the disk 16 to have a wedge action between the side cushions 21, and also directly against the central cushion 20, and this action will absorb many of the shocks incident to radial impacts. The grooves assist this action by increasing the resistance, and the grooves also increase the friction between the surfaces so that the driving or circumferential strains are communicated to the rim without danger of the parts slipping with respect to each other under ordinary driving thrusts.

The whole provides a wheel which can be constructed at comparatively little cost, and readily assembled, and with strength sufficient to resist strains incident to use while preserving the cushion effect between the parts.

I claim:

1. A wheel comprising an inner hub sleeve, a pair of abutting outer tubular hub sections fitting upon the outer side of said sleeve and covering the same lengthwise, each section having a radially extending disk the inner surface of which is inclined to form a tapered space between the disks, an outer tapered disk fitting between said disks, and cushions between the surfaces of the tapered disk and the inclined surfaces of the first mentioned disks.

2. A wheel comprising an inner hub sleeve, a pair of outer hub sections inclosing said sleeve, each of said sections having an extending disk the inner surface of which is inclined to form a tapered space between the two disks, an outer tapered disk fitting bebetween said disks, cushions between the adjacent faces of the outer disk and the hub disks, and a cushion between the hub sections and the inner edge of the outer disk.

In testimony whereof, I affix my signature in presence of two witnesses.

OSCAR TROMLITZ.

Witnesses:
JOHN A. BOMMHARDT,
BESSIE F. POLLAK.